US009815239B2

(12) United States Patent
Borse et al.

(10) Patent No.: US 9,815,239 B2
(45) Date of Patent: Nov. 14, 2017

(54) ROTARY THERMOFORMING APPARATUS AND METHOD OF USING SAME

(71) Applicants: Michael Borse, Western Springs, IL (US); Robert J. Borse, Plainfield, IL (US); Joseph Borse, Chicago, IL (US)

(72) Inventors: Michael Borse, Western Springs, IL (US); Robert J. Borse, Plainfield, IL (US); Joseph Borse, Chicago, IL (US)

(*) Notice: Subject to any disclaimer, the term of this patent is extended or adjusted under 35 U.S.C. 154(b) by 302 days.

(21) Appl. No.: 14/631,369

(22) Filed: Feb. 25, 2015

(65) Prior Publication Data

US 2015/0239170 A1    Aug. 27, 2015

Related U.S. Application Data

(60) Provisional application No. 61/945,075, filed on Feb. 26, 2014.

(51) Int. Cl.
*B29C 43/08* (2006.01)
*B29C 51/22* (2006.01)
*B29K 105/00* (2006.01)
*B29K 101/12* (2006.01)
*B29C 51/04* (2006.01)
*B29C 51/26* (2006.01)

(52) U.S. Cl.
CPC ........... *B29C 51/225* (2013.01); *B29C 51/04* (2013.01); *B29C 51/262* (2013.01); *B29C 2791/006* (2013.01); *B29C 2791/007* (2013.01); *B29K 2101/12* (2013.01); *B29K 2105/256* (2013.01)

(58) Field of Classification Search
CPC ....... B29C 51/22–51/38; B29C 51/225; B29C 51/262; B29C 2791/006; B29C 2791/007; B29K 2015/256; B29K 2101/12

USPC ................................... 425/388, 359, 360
See application file for complete search history.

(56) References Cited

U.S. PATENT DOCUMENTS 3,600,753 A    8/1971  Otto
4,235,579 A    11/1980 Kurz et al.
(Continued)

FOREIGN PATENT DOCUMENTS

GB      1258100        12/1971
WO      96/00144       1/1996

*Primary Examiner* — Joseph S Del Sole
*Assistant Examiner* — Thukhanh T Nguyen
(74) *Attorney, Agent, or Firm* — McDonnell Boehnen Hulbert & Berghoff LLP

(57) ABSTRACT

A rotary thermoforming apparatus including a rotatable drum having a plurality of cavity flats positioned on an outer surface of the drum together defining a mold cavity section of the drum, each cavity flat having one or more mold cavities, a plug assist assembly positioned adjacent each corresponding cavity flat when in a first retracted state, the plug assist assembly secured to, and rotatable with, the outer surface of the drum, each plug assist assembly having one or more plug assist members corresponding to the one or more mold cavities in the adjacent corresponding cavity flat, wherein each plug assist member is extendable into its corresponding mold cavity, and retractable from its corresponding mold cavity, wherein each plug assist assembly is extendable from the first retracted state to an extended state positioned over the corresponding cavity flat, and wherein each plug assist assembly is retractable from the extended state back to the first retracted state.

19 Claims, 11 Drawing Sheets

(56) References Cited

U.S. PATENT DOCUMENTS

| | | | |
|---|---|---|---|
| 4,244,915 A | 1/1981 | Boardman | |
| 4,375,146 A | 3/1983 | Chung | |
| 4,420,300 A | 12/1983 | Winstead | |
| 4,421,712 A | 12/1983 | Winstead | |
| 5,366,685 A | 11/1994 | Fujii et al. | |
| 5,783,229 A | 7/1998 | Manlove | |
| 6,086,800 A | 7/2000 | Manlove | |
| 6,394,783 B1 | 5/2002 | Dalgewicz, III et al. | |
| 6,814,905 B1 | 11/2004 | Dalgewicz et al. | |
| 7,204,681 B2 | 4/2007 | Fitzell, Jr. | |
| 7,241,129 B2 | 7/2007 | Mattice | |
| 7,883,330 B2 * | 2/2011 | Inoue | B30B 11/14 425/353 |
| 8,007,269 B1 | 8/2011 | Otto et al. | |
| 8,211,355 B2 | 7/2012 | Otto et al. | |
| 2010/0055272 A1 * | 3/2010 | Van Esbroeck | A21C 11/00 425/123 |

* cited by examiner

ROTARY THERMOFORMING APPARATUS AND METHOD OF USING SAME

BACKGROUND

The present application generally relates to the field of rotary thermoforming apparatus and methods of using same. More particularly, the present application relates to an improved rotary thermoforming apparatus that allows for continuous high speed part production.

Thermoforming has been used to mass produce plastic parts including packaging for food products. A sheet of thermoplastic material or other plastic material is positioned over one or more mold cavities. In some instances a vacuum is used to draw the thermoplastic or plastic into the mold cavities, and in other instances a positive pressure may be used to force the thermoplastic or plastic material into the mold cavities.

Furthermore, rotary thermoforming of parts has also been used where an extruded sheet of thermoplastic or plastic material is fed over the surface of a rotatory drum which contains a series of mold cavities on the outer surface of the drum. The material within each of the mold cavity cools as the drum rotates and is eventually removed from the mold cavity as a formed part, where it may undergo further processing steps in some instances.

In some applications one or more plug assist members may be used wherein the plug assist member is inserted into a corresponding female mold cavity forcing the thermoplastic or plastic material against the mold cavity. Typically, the rotary drum carries a plurality of cavity flats about the outer surface of the drum. A plug assist assembly containing plug assist members corresponding to the female mold cavities in a cavity flat is positioned over or above the drum, but does not rotate with the drum. When a cavity flat rotates into position beneath the plug assist assembly, the plug assist members are pushed into the mold cavities thereby forcing the thermoplastic or plastic material against the mold cavity. Some designs, such as U.S. Pat. No. 4,421,712 does follow the drum, but does not rotate with the drum. After a moment, the plug assist members are withdrawn and the rotary drum is further rotated until the next cavity flat is positioned beneath the plug assist assembly, and the plug assist members are again moved into the female mold cavities to force the thermoplastic or plastic material against the mold cavity. After a moment, the plug assists are withdrawn and the rotary drum is further rotated until the next cavity flat is positioned beneath the plug assist assembly, and process is repeated as each adjacent cavity flat is moved into position beneath the plug assist assembly.

A drawback of using plug assist members positioned above the drum in forming the parts is that, in some cases, the rotary drum may not continue to rotate while the plug assist members are moved into and out of the mold cavities on each of the respective cavity flats. As a result, the process of forming parts on a rotary drum with a plug assist assembly positioned over or above the drum may be limited in terms of the speed of operation because of the time it takes for the plug assist members to enter and exit the mold cavities for each of the respective cavity flats on the surface of the rotary drum.

Accordingly, it would be desirable to provide a rotary thermoforming apparatus and method of using the same, wherein parts could be continuously formed without requiring the rotary drum to stop as the plug assist members are inserted into and withdrawn from the cavities for each of the respective cavity flats on the outer surface of the rotary drum as the drum rotates, and also desirable to provide a rotary thermoforming apparatus and method of using the same where the parts could be formed and the rotary drum rotated at a faster rate of speed, to increase overall production, reduce cost, and provide for increased efficiency.

SUMMARY

In one aspect, a rotary thermoforming apparatus is provided including a rotatable drum having a plurality of cavity flats positioned on an outer surface of the drum together defining a mold cavity section of the drum, each cavity flat having one or more mold cavities, a plug assist assembly positioned adjacent each corresponding cavity flat when in a first retracted state, the plug assist assembly secured to, and rotatable with, the outer surface of the drum, each plug assist assembly having one or more plug assist members corresponding to the one or more mold cavities in the adjacent corresponding cavity flat, wherein each plug assist member is extendable into its corresponding mold cavity, and retractable from its corresponding mold cavity, wherein each plug assist assembly is extendable from the first retracted state to an extended state positioned over the corresponding cavity flat, and wherein each plug assist assembly is retractable from the extended state back to the first retracted state.

In another aspect, a rotary thermoforming apparatus is provided including a rotatable drum having a plurality of cavity flats positioned on an outer surface of the drum together defining a mold cavity section of the drum, each cavity flat having one or more mold cavities, a plug assist assembly positioned adjacent each corresponding cavity flat when in a first retracted state, the plug assist assembly secured to, and rotatable with, the outer surface of the drum, each plug assist assembly having one or more plug assist members corresponding to the one or more mold cavities in the adjacent corresponding cavity flat, each plug assist assembly extendable from the first retracted state to an extended state positioned over the corresponding cavity flat, wherein each plug assist assembly is retractable from the extended state back to the first retracted state, wherein each of the plug assist assemblies includes one or more cylinders for extending the plug assist members into the one or more corresponding mold cavities, and for retracting the plug assist members from the one or more corresponding mold cavities, further including a clamp plate attached to each of the plug assist assemblies for engaging the cavity flat prior to extending the plug assist members into the one or more corresponding mold cavities, and wherein each of the plug assist assemblies include means for extending and retracting the plug assist assemblies.

In a further aspect a method for thermoforming an article is provided including the steps of (i) providing a rotary thermoforming apparatus including a rotatable drum having a plurality of cavity flats positioned on an outer surface of the drum together defining a mold cavity section of the drum, each cavity flat having one or more mold cavities, a plug assist assembly positioned adjacent each corresponding cavity flat when in a first retracted state, the plug assist assembly secured to, and rotatable with, the outer surface of the drum, each plug assist assembly having a clamp plate and one or more plug assist members corresponding to the one or more mold cavities in the adjacent corresponding cavity flat, each plug assist assembly extendable from the first retracted state to an extended state positioned over the corresponding cavity flat, wherein each plug assist assembly is retractable from the extended state back to the first refracted state; (ii) passing a sheet of material to be thermoformed over the mold cavity section; (iii) extending one of the plug assist assemblies over a corresponding cavity flat; (iv) extending the clamp plate into engagement with the cavity flat; (v) extending the one or more plug assist members into the one or mold cavities in the corresponding cavity flat; (vi) retracting the clamp plate from engagement with the cavity flat; (vii) retracting the one or more plug assist members from the one or more mold cavities in the corresponding cavity flat; and (viii) retracting the plug assist assembly from over the corresponding cavity flat.

BRIEF DESCRIPTION OF THE DRAWINGS

Exemplary embodiments of the invention are described herein with reference to the drawings, wherein like parts are designated by like reference numerals, and wherein.

DETAILED DESCRIPTION

Figure 1:
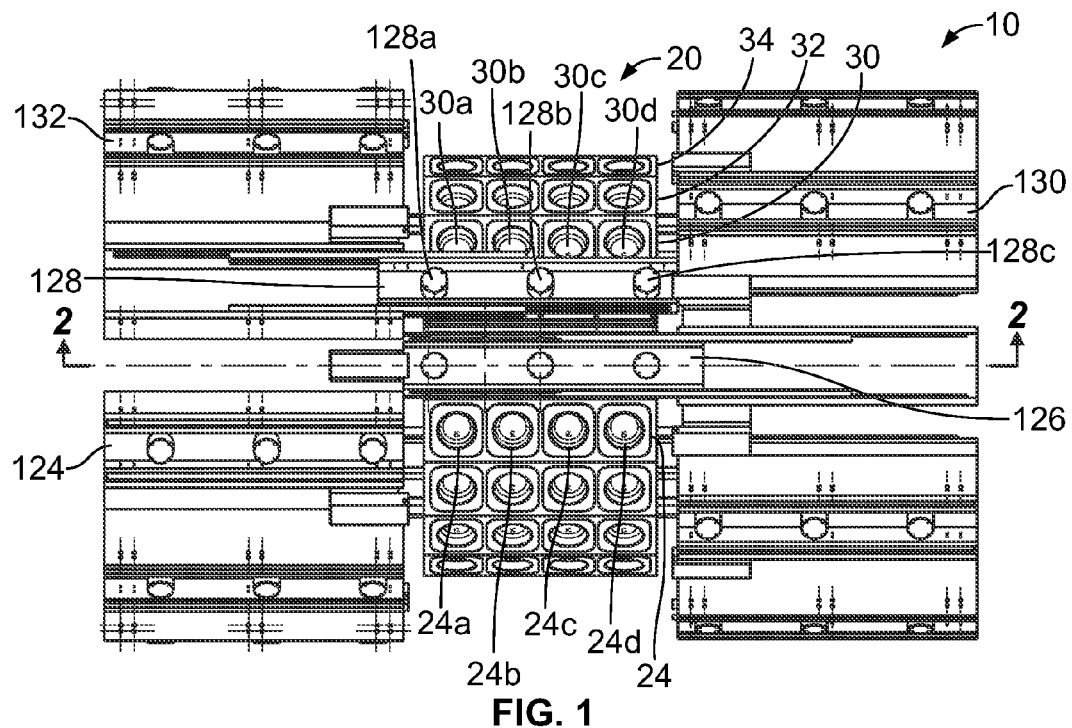
FIG. 1 is a side view of rotary thermoform drum 10.

FIG. 1 is a side view of rotary thermoform drum 10, having a mold cavity section 20 comprising a plurality of cavity flats each having a plurality of mold cavities. In particular, mold cavity section 20 includes mold cavity flat 24 having female mold cavities 24a-d and mold cavity flat 30 having female mold cavities 30a-d. The outer periphery of the mold cavity section 20 includes mold cavity flats including mold cavity flats 32 and 34. Also carried on the periphery of rotary thermoform drum 10 are plug assist assemblies associated with each of the respective cavity flats positioned on the outer surface of the rotary thermoform drum 10.

In particular, plug assist assembly 134 corresponds to cavity flat 34, plug assist assembly 132 corresponds to cavity flat 32, plug assist assembly 130 corresponds to cavity flat 30, etc. Cavity flats 134, 132, and 130 are shown in their normal retracted position on the periphery of rotary thermoform drum 10. Each plug assist assembly may include a plurality of plug assist members, coining ring, and clamp plate features that correspond to the plurality of female cavities in the corresponding cavity flat. In operation, when the rotary thermoform drum 10 is rotated into a desired position, a plug assist assembly is moved from its normal retracted position on the outer surface of drum 10 to an extended position where it is positioned over its corresponding cavity flat. As shown in FIG. 1, plug assist assembly 128 is shown in an extended position over cavity flat 28 and at the same time plug assist assembly 126 is shown in an extended position over cavity flat 26 (shown in FIG. 2). Once positioned over its corresponding cavity flat 26, cylinders 126a-c on the plug assist assembly 126 are extended to force plug assist members 226a-d into female cavities 26a-d on cavity flat 26 where a sheet of thermoplastic or plastic is forced against the walls of female cavities 26a-d to form the parts (as shown in FIG. 3).

Advantageously, because each cavity flat has a dedicated plug assist assembly and plug assist members consisting of one or more of the following features of a plug assist member, coining plate, and/or clamp plate that correspond to each of the female mold cavities in each cavity flat, more than one plug assist assembly may be positioned over its corresponding cavity flat and the plug assist members may be forced into their corresponding female mold cavities at the same time. In particular, as shown in FIG. 1, both plug assist assembly 126 and plug assist assembly 128 are shown in an extended state positioned over cavity flats 26 and 28 respectively. Even more advantageously, because each of the respective plug assist assemblies is located on the actual rotating surface of the drum and rotates along with the cavity flats, the plug assist members in the plug assist assemblies may stay in position with the plug assist members, coining plate and/or clamp plate pressed into or over the respective female mold cavities as the drum 10 rotates.

As a result, the drum does not need to stop while the plug assist members are forced into and then refracted from the respective female mold cavities, as may be the case where the plug assist members are positioned over or above the drum (and not positioned on the drum). Instead, the dedicated plug assemblies may rotate together with the cavity flats and drum to provide for a significantly increased time of rotation and associated increase in the number of parts that may be formed. After a period of time, e.g. a rotation of from 11 o'clock to 1 o'clock, the cylinders on the plug assemblies may be retracted to remove the plug assist members from the respective female mold cavities and then the plug assist assembly can be retracted back to its normal position exposing the cavity flats in a position that does not interfere with the positioning of the sheet of thermoplastic or plastic material over the mold cavity section 20 of drum 10.

Figure 2:
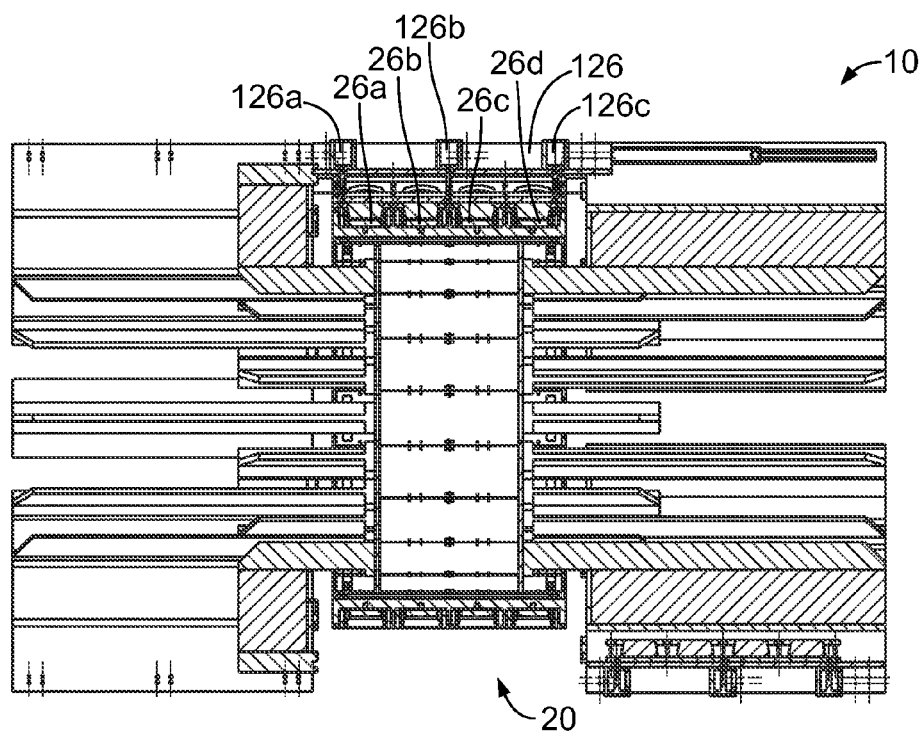
FIG. 2 is a cross-sectional view of the rotary thermoform drum 10 shown in FIG. 1 taken along line 2-2.
Figure 3:
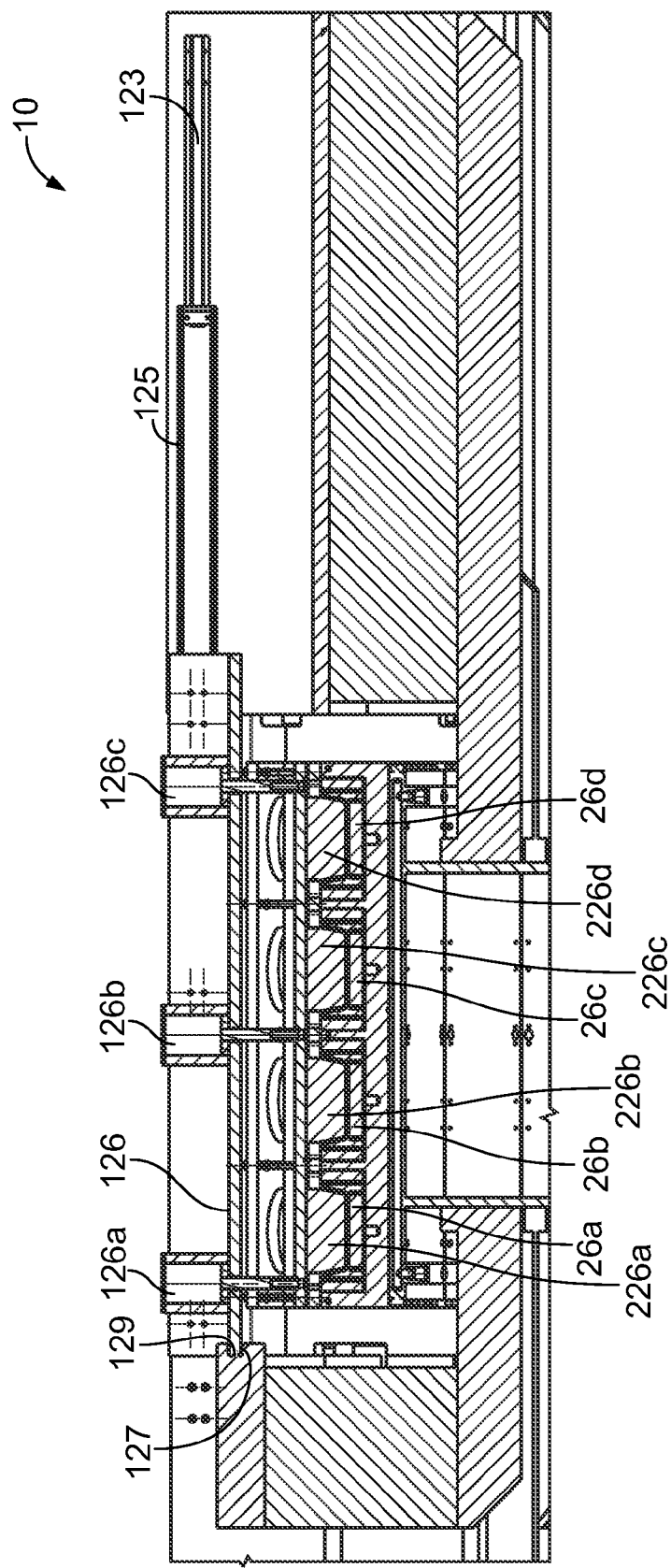
FIG. 3 is a close up view of the top of the cross-sectional view shown in FIG. 2.

FIG. 2 is a cross-sectional view of the rotary thermoform drum 10 shown in FIG. 1 taken along line 2-2, where plug assist assembly 126 (and cylinders 126a-c) is shown in an extended state over cavity flat 26 having female cavities 26a-d.

FIG. 3 is a close up view of the top of the cross-sectional view shown in FIG. 2. Again plug assist assembly 126 is shown in its extended position over cavity flat 26. Cylinders 126a-c positioned on plug assist assembly 126 are shown in an extended position wherein plug assist members 226a-d have been forced into the respective female mold cavities 26a-d.

Extending rails 123 and 125 are used to allow for the extension of plug assist assembly 126 while maintaining attachment of the plug assist assembly to the outer surface of the drum. A cylinder (not shown) may be attached to the end of plug assist assembly 126 to extend and retract the plug assist assembly over cavity flat 26. Further, plug assist assembly 126 has an end 129 that is positioned within slot 127 located on an opposite side of the mold cavity portion 20 than extending rails 123 and 125 when the plug assist assembly 126 is fully extended. Locking or locating pins or taper locks could also be used in place of slot 127. The slot 127 supports the end 129 of the plug assist assembly 126. In the absence of the supporting slot 127, the plug assist assembly would operate like a cantilever beam and the end could sag under the weight of the cylinders 126a-c and plug assist members 226a-d. The use of such a supporting slot arranged to eliminate the cantilever effect is particularly useful in applications where the width of the cavity flats is substantial. In this regard, it is contemplated that the width of cavity flats could be on the order of 48 inches or more.

Although not shown in the Figures, it is also contemplated that the dedicated plug assist assembly for each cavity flat could comprise two portions, one positioned on either side of the mold cavity section 20. In particular, in applications where the widths of the cavity flats are substantial, it may be desirable to have the two portions of the plug assist assembly (which may be of equal length, but are not required to be) extend over the cavity flat from both sides of the cavity flat. The use of two plug assist assemblies would take a shorter amount of time to be extended and refracted and the undesirable cantilever effect of a single plug assist assembly could be reduced. Further, the ends of the two portions of the plug assist assembly could interlock with one another in the extended positions to further reduce the overall cantilever effect, as the combined, interlocking plug assist assembly would be fixed at both ends.

Figure 4:
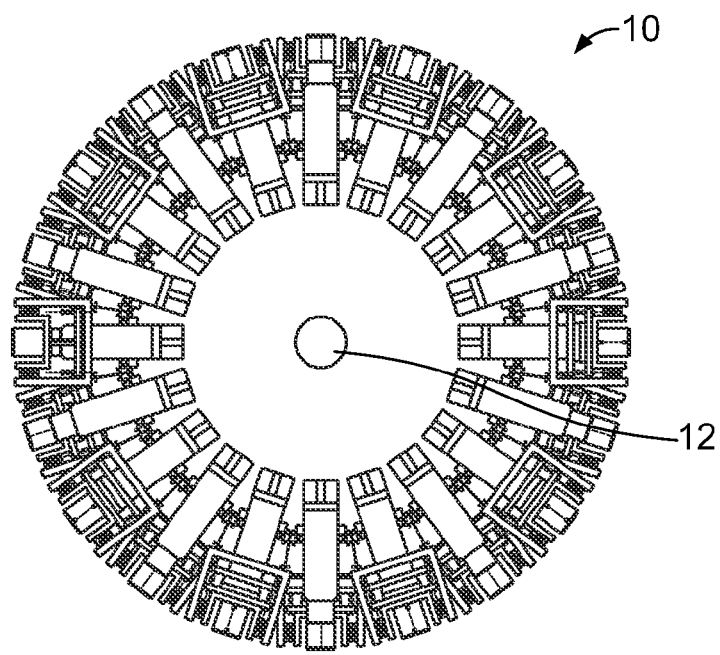
FIG. 4 is an end view of the rotary thermoform drum 10 shown in FIG. 1.

FIG. 4 is an end view of the rotary thermoform drum 10 shown in FIG. 1 that is rotatable about axis 12. It is contemplated that the drum may be on the order of 48-60 inches in diameter and have 20 cavity flats each with a dedicated plug assist assembly and corresponding plug assist members. Larger or smaller diameter drums having more or fewer cavity flats are also contemplated.

Figure 5:
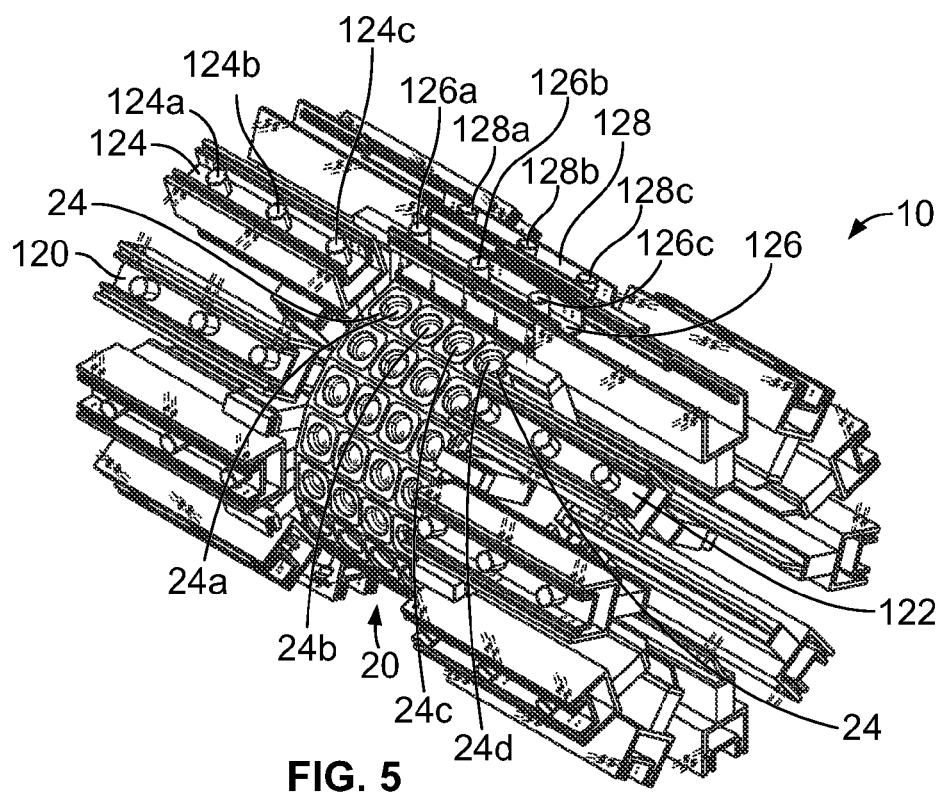
FIG. 5 is a perspective view of the rotary thermoform drum 10 shown in FIGS. 1 and 4.

FIG. 5 is a perspective view of the rotary thermoform drum 10 shown in FIGS. 1 and 4. Plug assist assembly 126 having cylinders 126a-c is shown in its extended state positioned over cavity flat 26 and at the same time plug assist assembly 128 having cylinders 128a-c is also in its extended state positioned over cavity flat 28. Further, plug assist assembly 124 with cylinders 124a-c is shown in its retracted state adjacent cavity flat 24 having female mold cavities 24a-d. Plug assist assemblies 122 and 120 are also shown in their retracted states. In the embodiments shown in FIGS. 1-5, it will be appreciated that the positioning of the plug assist assemblies for each cavity flat alternate from one side of the mold cavity section 20 of drum 10 to the opposite side. In particular, plug assist assembly 122 is positioned adjacent cavity flat 22 to the right of mold cavity section 20, and the next plug assist assembly 124 is positioned adjacent cavity flat 24 to the left of mold cavity section 20. Similarly, the next plug assist assembly 126 is positioned adjacent cavity flat 26 on the right side of mold cavity section 20. Alternating the location of the adjacent plug assist assemblies from one side of the mold cavity section 20 to the other advantageously allows for a reduced spacing between the cavity flats resulting in more cavity flats, up to twice as many than if the plug assist assemblies were positioned on only one side the mold cavity section 20.

Figure 6:
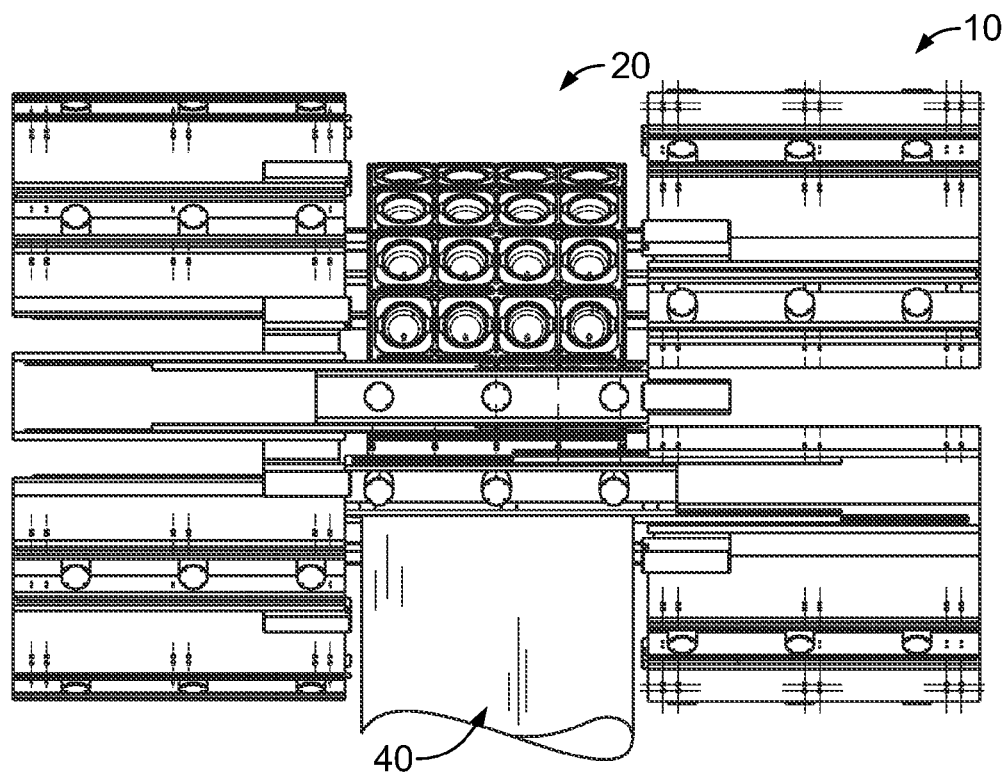
FIG. 6 is a side view of the rotary thermoform drum 10 shown in FIG. 1 with a thermoplastic sheet 40 extending over mold cavity section 20 of the rotary thermoform drum 10.
Figure 7:
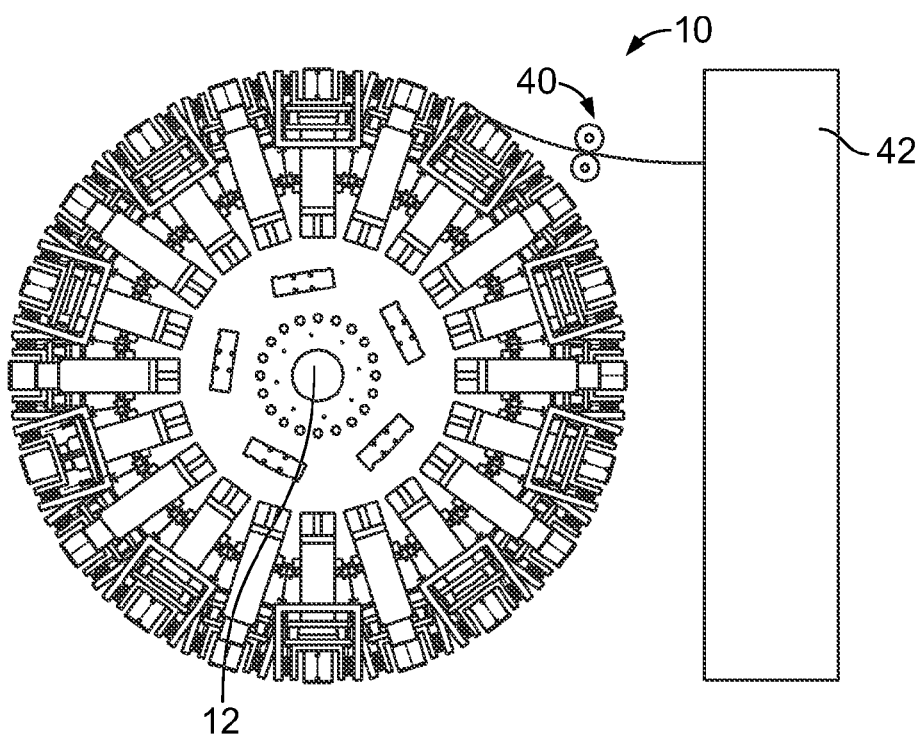
FIG. 7 is an end view of the rotary thermoform drum 10 shown in FIG. 6 with thermoplastic sheet 40 shown extending over the surface of the rotary thermoform drum 10.

FIG. 6 is a side view of the rotary thermoform drum 10 shown in FIG. 1 with a thermoplastic sheet 40 extending over mold cavity section 20 of the rotary thermoform drum 10 and FIG. 7 is an end view of the rotary thermoform drum 10 rotatable about axis 6 with thermoplastic sheet 40 shown extending over the surface of the rotary thermoform drum 10. In this example, the thermoplastic sheet 40 is shown exiting extruding machine 42 and extending directly over the rotary drum 10. However, the thermoplastic sheet may pass through a number of stations, rollers, etc. before it reaches the surface of drum 10. Furthermore, a thermoplastic or plastic sheet that has been previously extruded could also be used.

Figure 8:
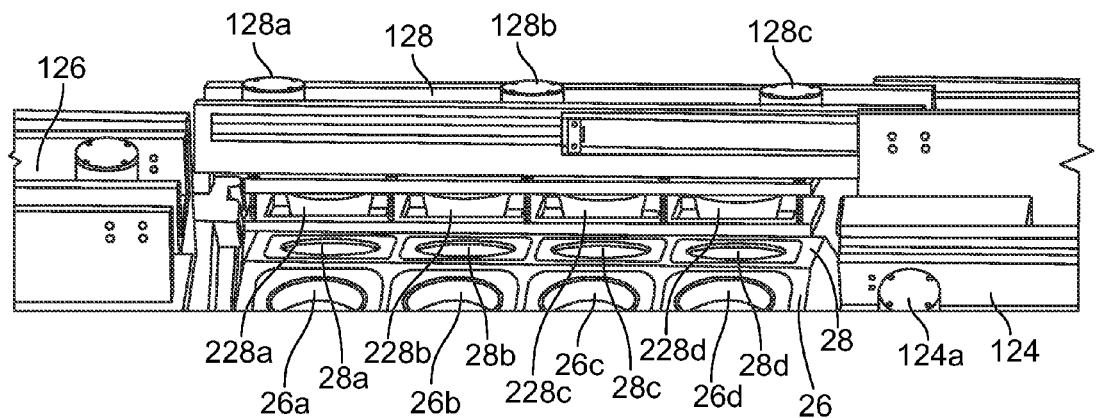
FIG. 8 is a side view of a top portion of the rotary thermoform drum 10 shown in FIGS. 1 and 4 with plug assist assembly 128 extended over cavity flat 28.

FIG. 8 is a side view of a top portion of the rotary thermoform drum 10 shown in FIGS. 1 and 4 with plug assist assembly 128 extended over cavity flat 28. In this example, the cylinders 128a-c are in a retracted position with plug assist members 228a-d positioned above female mold cavities 28a-d.

Figure 9:
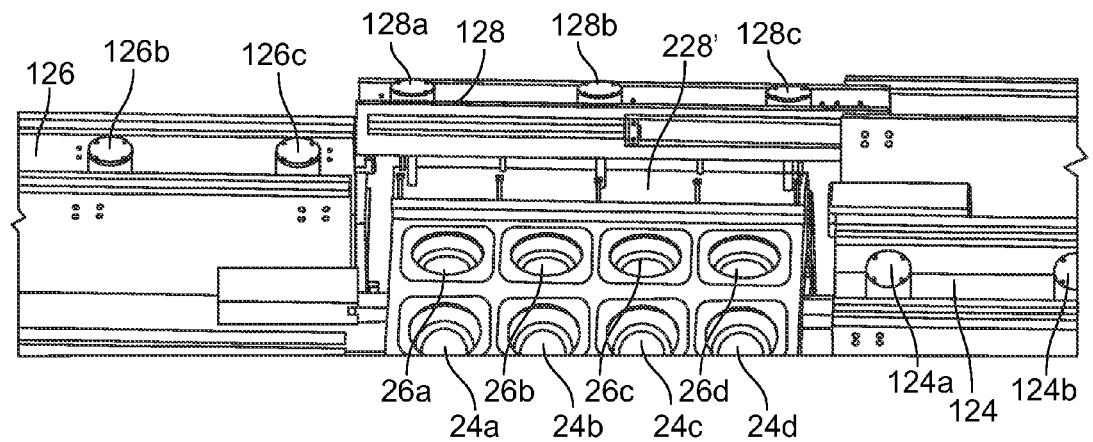
FIG. 9 is a side view of the top portion of the rotary thermoform drum 10 shown in FIG. 8 where the plug assist members on plug assist assembly 128 have been forced into the mold cavities in cavity flat 28.

FIG. 9 is a side view of the top portion of the rotary thermoform drum 10 shown in FIG. 8 where the cylinders 128a-c have been extended to press plug assist members 228a-d into the respective mold cavities 28a-d in cavity flat 28. Prior to extending the cylinders 128a-c to press the plug assist members 228a-d into the respective mold cavities, the plug assist assembly 128 includes a platen 228' that is brought into contact with the cavity flat to hold the thermoplastic material in place about the periphery of the mold cavities. In this manner, the thermoplastic is held in position as the plug assist members 228a-d are pressed into the mold cavities 28a-d.

Figure 10A:
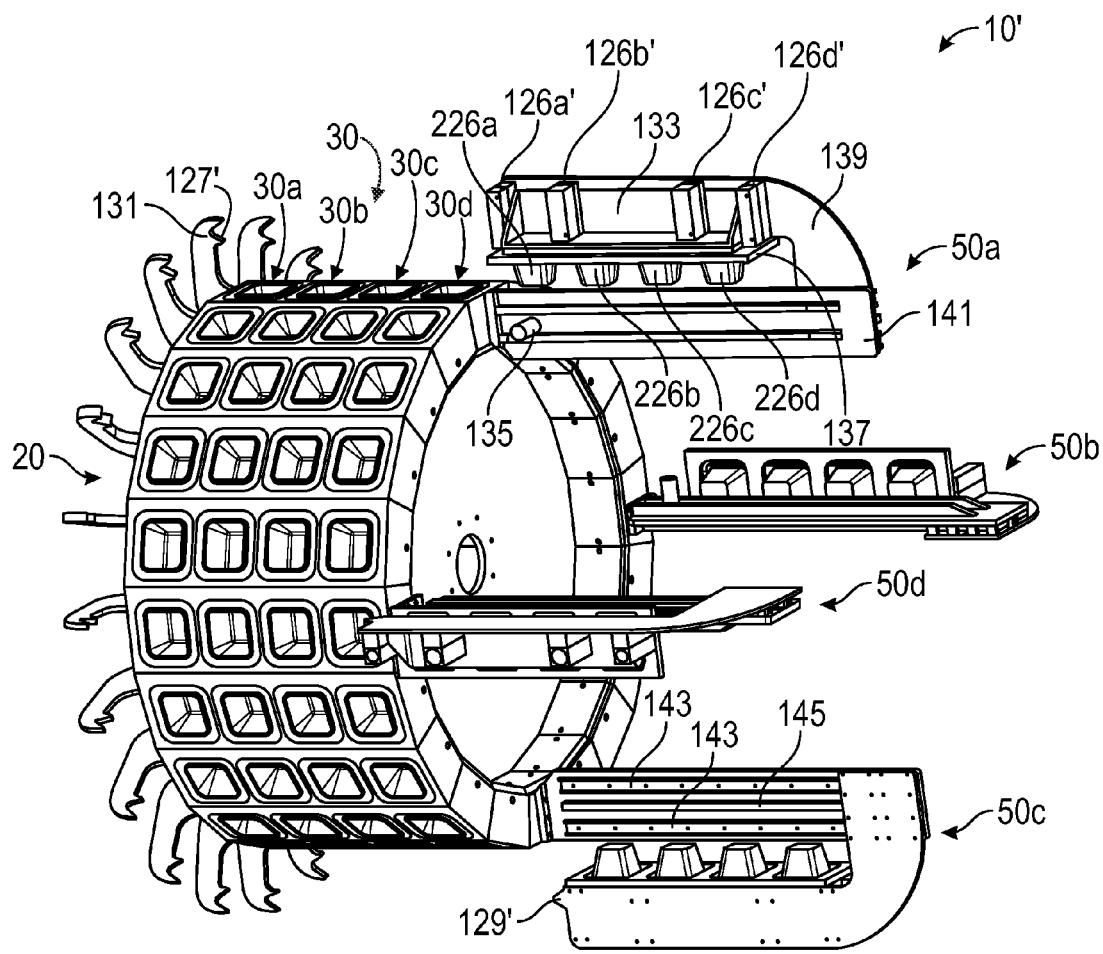
FIG. 10A is a perspective view of rotary thermoform drum 10' shown with plug assist assemblies 50a-d shown in a retracted state.

FIGS. 10A-E illustrate the operation of rotary thermoform drum 10'. FIG. 10A is a perspective view of rotary thermoform drum 10' shown with plug assist assemblies 50a-d shown in a retracted state. Rotary thermoform drum 10' differs slightly from the rotary thermoform drum 10 shown in FIGS. 1-9. Like numerals will be used where the drum 10' is the same as drum 10, and apostrophes or different numerals will be used where there are differences. In FIGS. 10A-E, only four plug assist assemblies 50a-50d are included to allow for a better view of the components and operation of rotary thermoform drum 10' although in operation there would be a plug assist assembly corresponding to each cavity flat on the mold cavity portion 20 of rotary thermoform drum 10'.

Each of the plug assist assemblies 50a-50d are normally positioned adjacent a corresponding cavity flat in a retracted state as shown in FIG. 10A, in this embodiment with each cavity flat having four mold cavities. Each of the plug assist assemblies 50a-d are constructed the same although the structure and operation of each will be described primarily with respect to plug assist assembly 50a. Plug assist assembly 50a is secured to a slide mount bracket 141 that is attached to edge of the mold cavity section 20. The slide mount bracket 141 rotates as the mold cavity section 20 rotates, but otherwise remains stationary throughout the operation. An assist actuation plate or arm 139 is secured to an outer end of the slide mount bracket 141. The assist actuation plate 139 is in turn attached to assist plug mounting bracket 133. Cylinders 126a'-c' and 126d are secured to the assist actuation plate 139. A clamp plate 137 is attached to the ends of the cylinder rods of outer cylinders 126a' and 126d. Plug assist members 226a-d are attached to the ends of the cylinder rods of inner cylinders 126b' and 126c'.

The plug assist assembly 50a is positioned adjacent corresponding cavity flat 30 having mold cavities 30a-d. A servo drive 135 is shown positioned on slide mount bracket 141 and is used to extend and retract the plug assist assembly 50a. As best seen in plug assist assembly 50c, the servo drive 135 (shown in plug assist assembly 50a) transmits rotary motion into linear motion using ball screw 145. Guide rails 143 are used to guide the assist actuator plate 139 during extension and retraction. Other ways of extending and retracting the plug assist assemblies 50a-d may also be used. For example, a linear motor, linear actuator, rack and pinion, pulley systems, a system of gears, or pneumatic or hydraulic cylinders may also be used.

In addition, on the opposite side of the mold cavity section from the plug assist assembly 50a is positioned an upwardly extending locating support lock 131. The locating support lock 131 includes a notch 127' that is adapted to receive a corresponding lock extension 129' (best seen on plug assist assembly 50c). Upon extension of the plug assist assembly, the lock extensions 129' extends into engagement with the notch 127' to support the far end of the assist actuator plate 139, to prevent any sagging at the end of the assist actuator plate 139 when it is in an extended position.

Figure 10B:
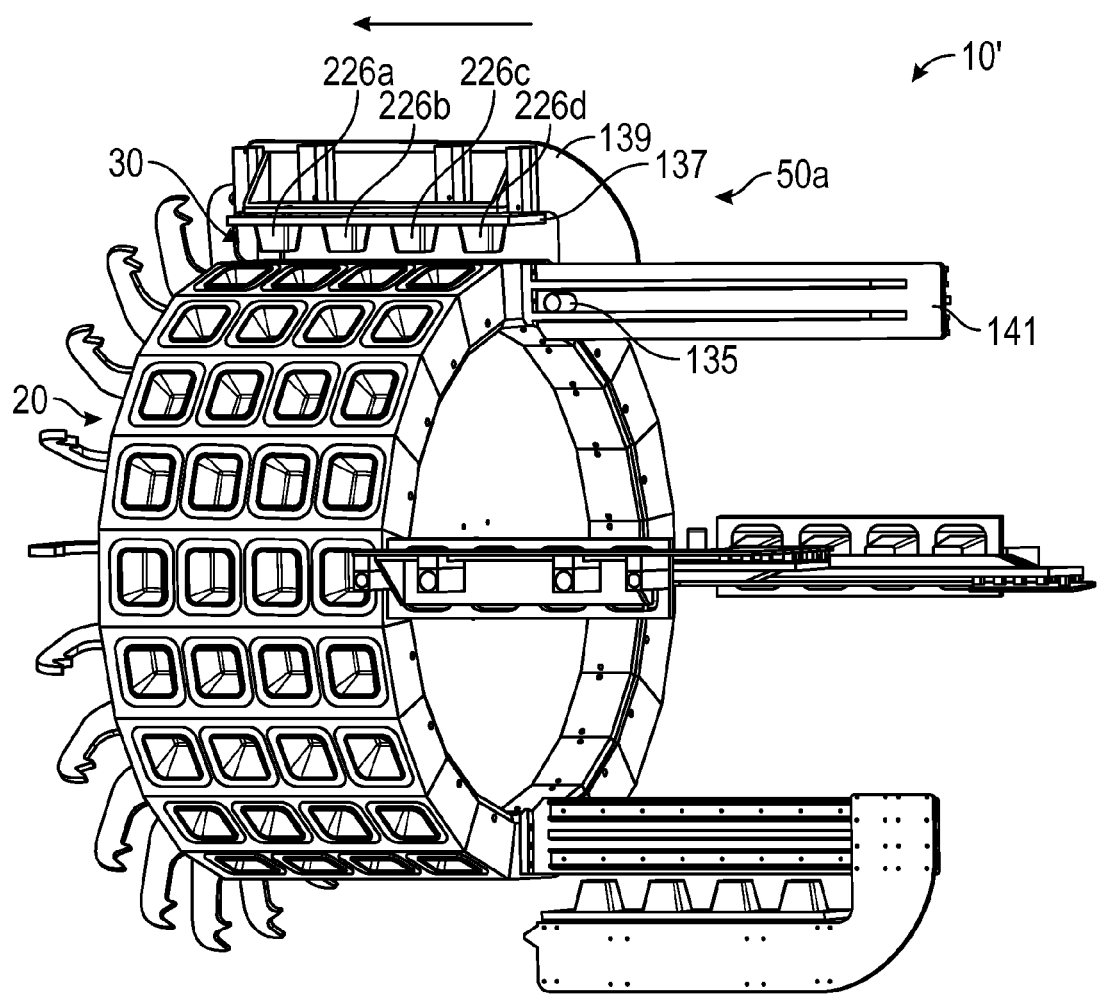
FIG. 10B is a perspective view of the rotary thermoform drum 10' shown in FIG. 10A after plug assist assembly 50a has been extended over the corresponding cavity flat 30 of mold cavity section 20 of drum 10'.

FIG. 10B is a perspective view of the rotary thermoform drum 10' shown in FIG. 10A after plug assist assembly 50a has been extended over the corresponding cavity flat 30 of mold cavity section 20 of drum 10' by servo drive 135 on slide mount bracket 141. With assist actuator plate 139 moved into this extended position, clamp plate 137 is positioned above the corresponding cavity flat 30 as are plug assist members 226a-d. The clamp plate 137 is now in position to be lowered into a forced engagement with the corresponding cavity flat 30 and clamp the thermoplastic material (not shown) positioned over the cavity flat 30 in place.

Figure 10C:
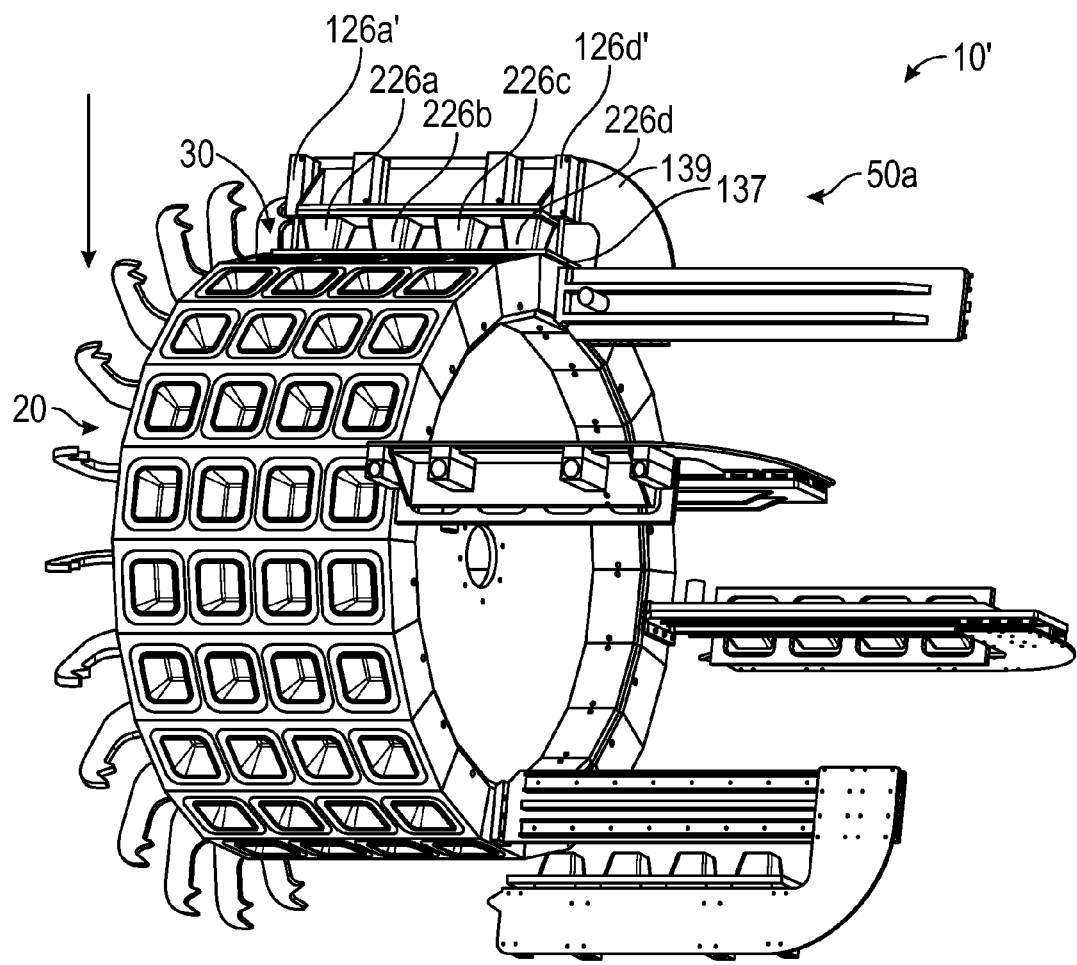
FIG. 10C is a perspective view of the rotary thermoform drum 10' shown in FIG. 10B after cylinders 126a' and 126 have been extended to force the clamp plate 137 against the cavity flat 30.

FIG. 10C is a perspective view of the rotary thermoform drum 10' shown in FIG. 10B after cylinders 126a' and 126d have been extended to force the clamp plate 137 against the cavity flat 30 and hold the thermoplastic material in place. However, plug assist members 226a-d are at this point still positioned over the corresponding cavity flat of mold cavity section 20.

Figure 10D:
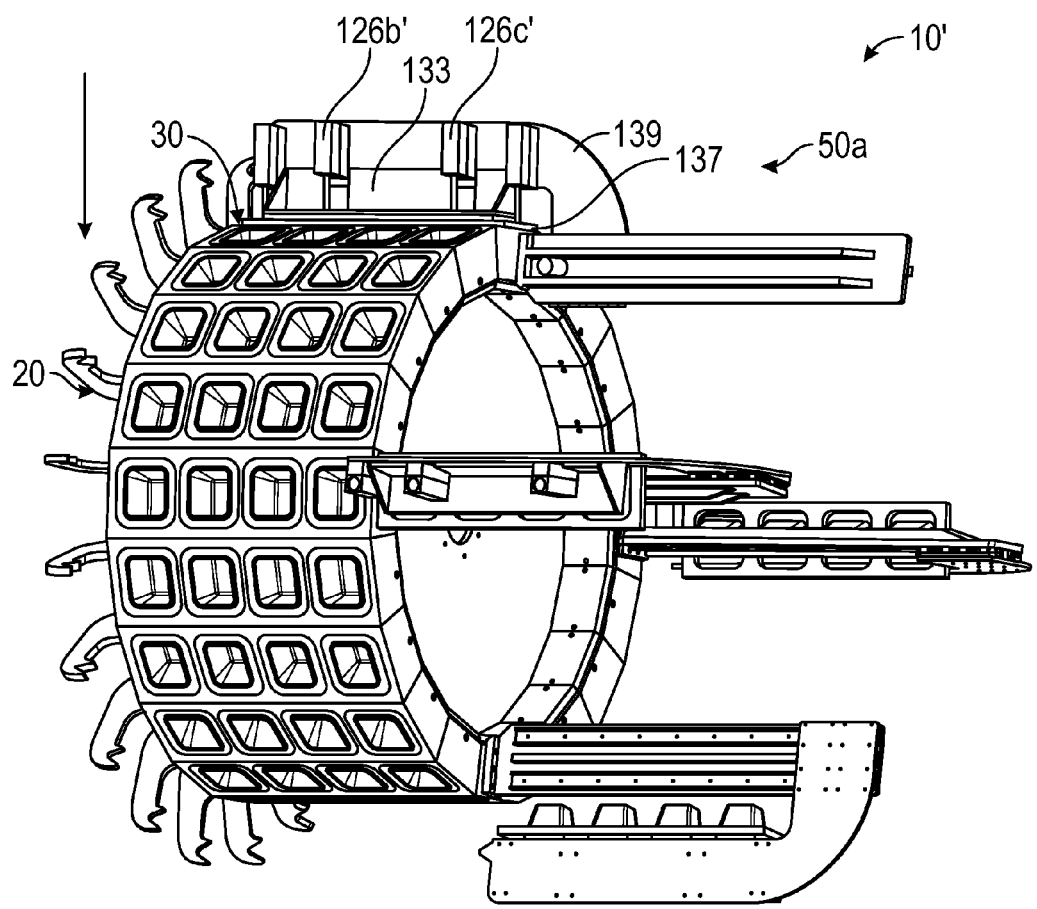
FIG. 10D is a perspective view of the rotary thermoform drum 10' shown in FIG. 10C after cylinders 126b' and 126c' have been extended to force the plug assist members into the mold cavities in the corresponding cavity flat 30.

FIG. 10D is a perspective view of the rotary thermoform drum 10' shown in FIG. 10C after cylinders 126b' and 126c' have been extended to force the plug assist members 226a-d into the mold cavities in the corresponding cavity flat 30 on mold cavity section 20, with clamp plate still in engagement with the corresponding cavity flat 30.

Figure 10E:
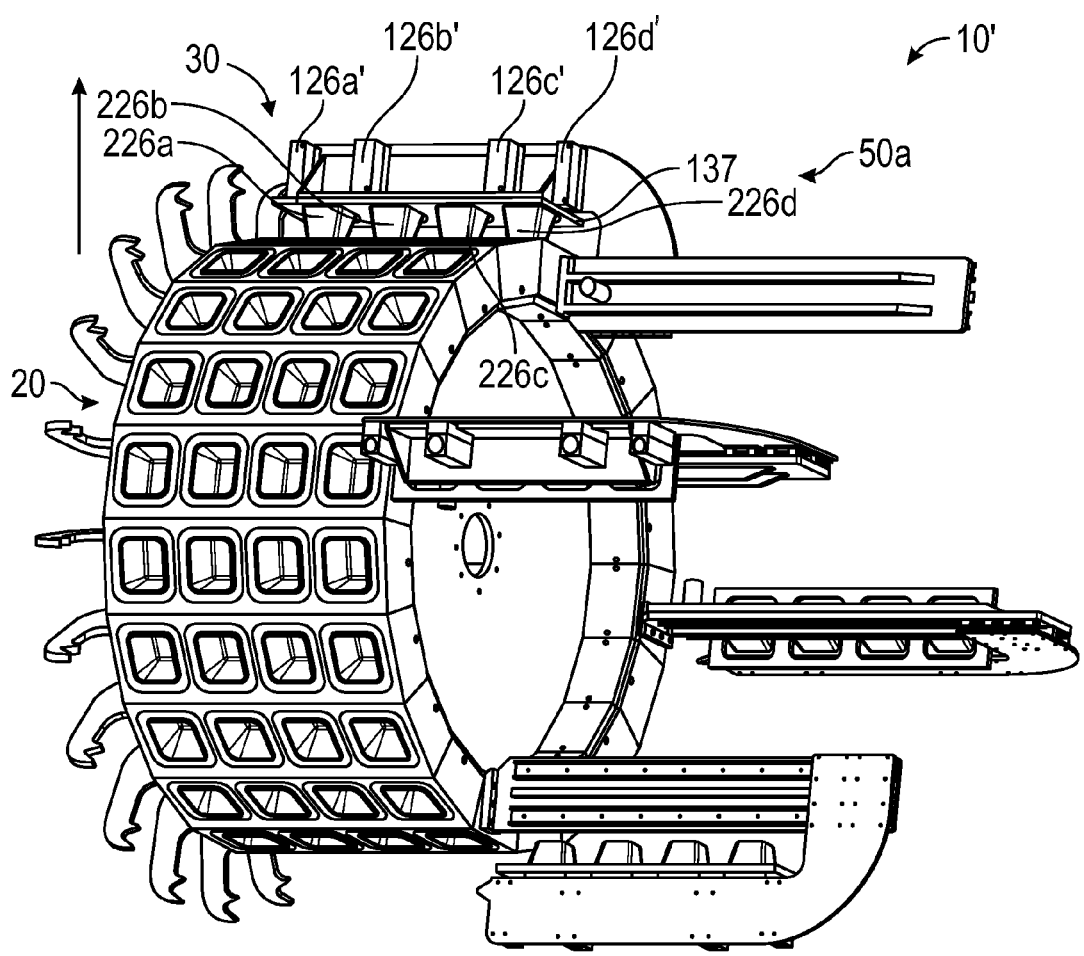
FIG. 10E is a perspective view of the rotary thermoform drum 10' shown in FIG. 10D after cylinders 126b' and 126c' have been retracted to remove the plug assist members 226a-d from the mold cavities 30a-d in the corresponding cavity flat 30, and after the cylinders 126a' and 126d have been retracted to move the clamp plate 137 out of engagement with the corresponding cavity flat 30.

FIG. 10E is a perspective view of the rotary thermoform drum 10' shown in FIG. 10D after cylinders 126b' and 126c' have been retracted to remove the plug assist members 226a-d from the mold cavities in the corresponding cavity flat 30, and after the cylinders 126a' and 126d have been retracted to move the clamp plate 137 out of engagement with the corresponding cavity flat 30. After this, the plug assist assembly 50a will be retracted back to a retracted position as shown in FIG. 10A, although the mold cavity section 20 will have rotated further along.

Figure 11:
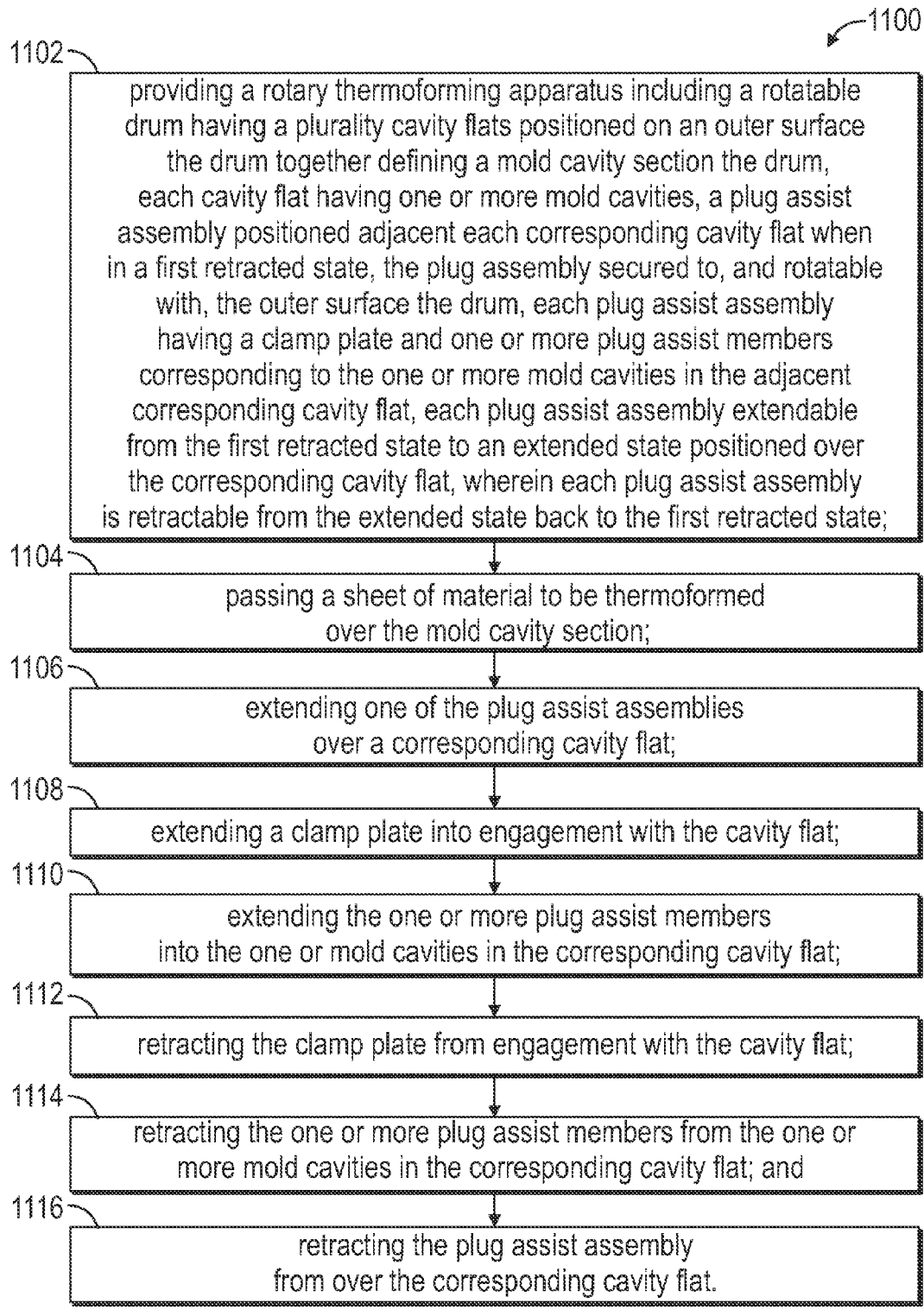
FIG. 11 is an example method 1100.

FIG. 11 is directed to a method 1100 of thermoforming an article. Method 1100 may include the step 1102 of providing a rotary thermoforming apparatus including a rotatable drum having a plurality of cavity flats positioned on an outer surface of the drum together defining a mold cavity section of the drum, each cavity flat having one or more mold cavities, a plug assist assembly positioned adjacent each corresponding cavity flat when in a first retracted state, the plug assist assembly secured to, and rotatable with, the outer surface of the drum, each plug assist assembly having a clamp plate and one or more plug assist members corresponding to the one or more mold cavities in the adjacent corresponding cavity flat, each plug assist assembly extendable from the first retracted state to an extended state positioned over the corresponding cavity flat, wherein each plug assist assembly is retractable from the extended state back to the first retracted state; the step 1104 of passing a sheet of material to be thermoformed over the mold cavity section; the step 1106 of extending one of the plug assist assemblies over a corresponding cavity flat; the step 1108 of extending a clamp plate into engagement with the cavity flat; the step 1110 of extending the one or more plug assist members into the one or mold cavities in the corresponding cavity flat; the step 1112 of retracting the clamp plate from engagement with the cavity flat; the step 1114 of retracting the one or more plug assist members from the one or more mold cavities in the corresponding cavity flat; and the step 1116 of retracting the plug assist assembly from over the corresponding cavity flat.

Example embodiments have been described above. Those skilled in the art will understand that changes and modifications may be made to the described embodiments without departing from the true scope and spirit of the present invention, which is defined by the claims.

We claim:

1. A rotary thermoforming apparatus, comprising:
   a rotatable drum having a plurality of cavity flats positioned on an outer surface of the drum together defining a mold cavity section of the drum;
   each cavity flat having one or more mold cavities;
   a plurality of plug assist assemblies, wherein each plug assist assembly is positioned adjacent a corresponding cavity flat when in a first retracted state, the plug assist assembly secured to, and rotatable with, the outer surface of the drum;
   each plug assist assembly having one or more plug assist members corresponding to the one or more mold cavities in the adjacent corresponding cavity flat;
   wherein each plug assist member is extendable into its corresponding mold cavity, and retractable from its corresponding mold cavity;
   wherein each plug assist assembly is extendable from the first retracted state to an extended state positioned over the corresponding cavity flat;
   wherein each plug assist assembly is retractable from the extended state back to the first retracted state; and
   wherein the plug assist assemblies are alternately positioned on a first side of the mold cavity section and a second side of the mold cavity section that is opposite the first side.

2. The apparatus of claim 1, wherein each plug assist assembly has an end that is positionable within a corresponding slot or over a support on an opposite side of the mold cavity section when the plug assist assembly is positioned in its extended state.

3. The apparatus of claim 1, wherein each plug assist assembly has an end having a lock extension that is positionable within a corresponding notch in a locating support lock positioned on an opposite side of the mold cavity section when the plug assist assembly is positioned in its extended state.

4. A rotary thermoforming apparatus, comprising:
a rotatable drum having a plurality of cavity flats positioned on an outer surface of the drum together defining a mold cavity section of the drum;
each cavity flat having one or more mold cavities;
a plug assist assembly positioned adjacent each corresponding cavity flat when in a first retracted state, the plug assist assembly secured to, and rotatable with, the outer surface of the drum;
each plug assist assembly having one or more plug assist members corresponding to the one or more mold cavities in the adjacent corresponding cavity flat;
wherein each plug assist member is extendable into its corresponding mold cavity, and retractable from its corresponding mold cavity;
wherein each plug assist assembly is extendable from the first retracted state to an extended state positioned over the corresponding cavity flat;
wherein each plug assist assembly is retractable from the extended state back to the first retracted state wherein the plug assist assemblies are each comprised of a first portion and a second portion;
wherein the first portion is positioned on an opposite side of the corresponding cavity flat than the second portion, and
wherein the first portion and second portion are each extendable from a first retracted state to an extended state where the first portion and second portion are positioned over the corresponding cavity flat.

5. The apparatus of claim 4, wherein the ends of the first portion and the second portion interlock when the first portion and the second portion are in the extended state.

6. The apparatus of claim 1, wherein each of the plug assist assemblies includes one or more cylinders for extending the plug assist members into the one or more corresponding mold cavities, and for retracting the plug assist members from the one or more corresponding mold cavities.

7. The apparatus of claim 1, further including a clamp plate attached to each of the plug assist assemblies for engaging the cavity flat prior to extending the plug assist members into the one or more corresponding mold cavities.

8. The apparatus of claim 1, further including a slide mount bracket extending from an edge of the mold cavity section adjacent each of the cavity flats;
wherein each of the plug assist assemblies has an assist actuation plate attached the slide mount bracket;
wherein a plug assist mounting bracket is attached to each of the assist actuation plates;
wherein one or more cylinders are attached to each of the assist actuation plates adapted to extend a clamp plate into engagement with a corresponding cavity flat; and
wherein one or more cylinders are attached to the assist actuation plates adapted to extend the plug assist members into the mold cavities in the mold cavity flats.

9. The apparatus of claim 1, further including means for extending and retracting the plug assist assemblies.

10. The apparatus of claim 1, wherein a servo drive and ball screw are positioned on each of the assist actuation plates operable to extend and retract the plug assist assemblies.

11. A rotary thermoforming apparatus, comprising:
a rotatable drum having a plurality of cavity flats positioned on an outer surface of the drum together defining a mold cavity section of the drum;
each cavity flat having one or more mold cavities;
a plurality of plug assist assemblies, wherein each plug assist assembly is positioned adjacent a corresponding cavity flat when in a first retracted state, the plug assist assembly secured to, and rotatable with, the outer surface of the drum;
each plug assist assembly having one or more plug assist members corresponding to the one or more mold cavities in the adjacent corresponding cavity flat;
each plug assist assembly extendable from the first retracted state to an extended state positioned over the corresponding cavity flat;
wherein each plug assist assembly is retractable from the extended state back to the first retracted state;
wherein each of the plug assist assemblies includes one or more cylinders for extending the plug assist members into the one or more corresponding mold cavities, and for retracting the plug assist members from the one or more corresponding mold cavities;
wherein each of the plug assist assemblies further includes a clamp plate for engaging the cavity flat prior to extending the plug assist members into the one or more corresponding mold cavities;
wherein each of the plug assist assemblies include means for extending and retracting the plug assist assemblies; and
wherein the plug assist assemblies are alternately positioned on a first side of the mold cavity section and a second side of the mold cavity section that is opposite the first side.

12. The apparatus of claim 11, further including a slide mount bracket extending from an edge of the mold cavity section adjacent each of the cavity flats;
wherein each of the plug assist assemblies has an assist actuation plate attached to each of the slide mount brackets;
wherein an assist plug mounting bracket is attached to each of the assist actuation plates;
wherein one or more cylinders are attached to each of the assist actuation plates adapted to extend a clamp plate into engagement with a corresponding cavity flat; and
wherein one or more cylinders are attached to each of the assist actuation plates adapted to extend the plug assist members into the corresponding mold cavities in the mold cavity flats.

13. The apparatus of claim 12, wherein a servo drive and ball screw are positioned on each of the assist actuation plate operable to extend and retract the plug assist assemblies.

14. The apparatus of claim 12, wherein each plug assist assembly has an end that is positionable within a corresponding slot or over a support on an opposite side of the mold cavity section when the plug assist assembly is positioned in its extended state.

15. The apparatus of claim 12, wherein each of the plug assist assemblies has an end having a lock extension that is positionable within a corresponding notch in a locating support lock positioned on an opposite side of the mold cavity section when the plug assist assembly is positioned in its extended state.

16. A method of thermoforming an article, comprising the steps of:
providing a rotary thermoforming apparatus including a rotatable drum having a plurality of cavity flats positioned on an outer surface of the drum together defining a mold cavity section of the drum, each cavity flat having one or more mold cavities, a plurality of plug assist assemblies, wherein each plug assist assembly is positioned adjacent a corresponding cavity flat when in a first retracted state, the plug assist assembly secured to, and rotatable with, the outer surface of the drum, each plug assist assembly having and one or more plug assist members corresponding to the one or more mold cavities in the adjacent corresponding cavity flat, wherein each plug assist member is extendable into its corresponding mold cavity, and retractable from its corresponding mold cavity, wherein each plug assist assembly is extendable from the first retracted state to an extended state positioned over the corresponding cavity flat, wherein each plug assist assembly is retractable from the extended state back to the first retracted state, and wherein the plug assist assemblies are alternately positioned on a first side of the mold cavity section and a second side of the mold cavity section that is opposite the first side;

passing a sheet of material to be thermoformed over the mold cavity section;

extending one of the plug assist assemblies over a corresponding cavity flat;

extending the one or more plug assist members into the one or mold cavities in the corresponding cavity flat;

retracting the one or more plug assist members from the one or more mold cavities in the corresponding cavity flat; and retracting the plug assist assembly from over the corresponding cavity flat.

17. The method of claim 16, wherein the rotary thermoforming apparatus further includes a slide mount bracket extending from an edge of the mold cavity section adjacent each of the cavity flats;

wherein each of the plug assist assemblies has an assist actuation plate attached the slide mount brackets;

wherein an assist plug mounting bracket is attached to each of the assist actuation plates;

wherein one or more cylinders are attached to the assist actuation plates adapted to extend a clamp plate into engagement with a corresponding cavity flat; and wherein one or more cylinders are attached to the assist actuation plates adapted to extend the plug assist members into the mold cavities in the corresponding mold cavity flats.

18. The method of claim 17, wherein a servo drive and ball screw are positioned on each of the assist actuation plate operable to extend and retract the plug assist assemblies.

19. The method of claim 16, wherein each of the plug assist assemblies has an end having a lock extension that is positionable within a corresponding notch in a locating support lock positioned on an opposite side of the mold cavity section when the plug assist assembly is positioned in its extended state.

* * * * *